US007226517B2

(12) United States Patent
Lane

(10) Patent No.: US 7,226,517 B2
(45) Date of Patent: Jun. 5, 2007

(54) METHOD OF SURFACING A SUBSTRATE

(76) Inventor: Paul Lane, 6424 Pinecastle Blvd., Ste. B, Orlando, FL (US) 32809

( * ) Notice: Subject to any disclaimer, the term of this patent is extended or adjusted under 35 U.S.C. 154(b) by 217 days.

(21) Appl. No.: 10/977,056

(22) Filed: Oct. 29, 2004

(65) Prior Publication Data

US 2005/0167027 A1 Aug. 4, 2005

Related U.S. Application Data

(60) Provisional application No. 60/540,455, filed on Jan. 30, 2004.

(51) Int. Cl.

| | |
|---|---|
| ***E04F 13/07*** | (2006.01) |
| ***E04F 13/14*** | (2006.01) |
| ***B29C 65/48*** | (2006.01) |
| ***B32B 37/00*** | (2006.01) |
| ***B32B 38/04*** | (2006.01) |
| ***B32B 43/00*** | (2006.01) |

(52) U.S. Cl. ........................................ 156/71; 156/258

(58) Field of Classification Search .................. 156/71, 156/256, 297, 378, 250, 258, 264, 267
See application file for complete search history.

(56) References Cited

U.S. PATENT DOCUMENTS

| | | | | |
|---|---|---|---|---|
| 3,710,447 | A * | 1/1973 | Howlett | 33/194 |
| 4,218,496 | A * | 8/1980 | Savignac | 427/263 |
| 4,664,982 | A | 5/1987 | Genovese et al. | |
| 5,028,459 | A | 7/1991 | Lathrop | |
| 5,342,565 | A | 8/1994 | Goren | |
| 5,470,140 | A * | 11/1995 | Schagunn | 312/140.3 |
| 5,486,324 | A | 1/1996 | Klein, Jr. | |
| 5,549,862 | A | 8/1996 | Vail | |
| 5,755,983 | A | 5/1998 | Bordener | |
| 5,885,503 | A | 3/1999 | Bordener | |

(Continued)

FOREIGN PATENT DOCUMENTS

| | | | | |
|---|---|---|---|---|
| EP | 253628 | A | * | 1/1988 |
| JP | 2001313373 | A | | 11/2001 |

*Primary Examiner*—Chris Fiorilla
*Assistant Examiner*—Sing P. Chan
(74) *Attorney, Agent, or Firm*—Christine Q. McLeod; Beusse Wolter Sanks Mora & Maire

(57) ABSTRACT

A method is provided of resurfacing a substrate with a natural stone the substrate having a top surface and an edge, the method including placing a plurality of templating strips on the top surface to form a template defining an outside dimension, cutting out a top piece for resurfacing the top surface based on the outside dimension of the template, cutting out an edge band for resurfacing the edge of the substrate, bonding the edge band and the top piece together to form a replacement top and adhesively joining the replacement top to the substrate. A plurality of templating jigs may be used for forming a template. Pieces of natural stone may have respective bevel cuts made in their respective edges for adjoining with other pieces to form a replacement top of natural stone. Inside edges may be reinforced with a fiberglass cloth coated with a polyester resin. A plurality of natural stone pieces may be adjoined to form a segmented radius of curvature for covering a corresponding radius of curvature of an edge of the existing substrate.

12 Claims, 6 Drawing Sheets

U.S. PATENT DOCUMENTS

| | | | |
|---|---|---|---|
| 6,183,585 | B1 | 2/2001 | Kelley |
| 6,258,190 | B1 | 7/2001 | Sciarrino et al. |
| 6,309,501 | B1 | 10/2001 | Kelley |
| 6,418,696 | B1 | 7/2002 | Swingle |
| 6,491,852 | B1 | 12/2002 | Sedaka |
| 6,773,538 | B2 | 8/2004 | Blessing |

* cited by examiner

METHOD OF SURFACING A SUBSTRATE

RELATED APPLICATION

This application claims the benefit under Title 35, United States Code, Sec. 120 of U.S. application No. 60/540,455 filed on Jan. 30, 2004 and titled Method of Resurfacing the specification of which is herein specifically incorporated by reference.

BACKGROUND OF THE INVENTION

This invention relates in general to fabricating material used for utilitarian and decorative surfaces and in particular to a method of fabricating slabs of natural stone for resurfacing existing structures or surfacing new construction.

Granite is used in many different applications such as fireplace surrounds, shower walls, columns, flooring and countertops. Natural stone granite and marble are typically cut in slabs that are approximately two to three centimeters thick. Such slabs have traditionally been fabricated by cutting and shaping into appropriate sizes at this thickness to form new or replacement countertops.

Three areas of concern with respect to using traditional granite for countertop replacement are: 1) inconvenience to the customer, 2) turn around time to complete the job and 3) countertop removal. Replacing countertops is difficult, time consuming and potentially stressful for the customer. It typically requires more than one skilled trade to complete installation and quite often causes collateral damage to surrounding surfaces that have to be repaired at the customer's expense. It frequently takes upwards of eight to ten weeks or longer for countertops to be replaced using traditional processes and materials.

SUMMARY OF THE INVENTION

Technology has been developed to cut natural stone slabs thinner than the traditional two to three centimeter thick slabs. This was done to increase the yield of the blocks from which the slabs are cut. The new thickness varies from about five millimeters to about two centimeters. Processing or fabricating natural stone this thin has proved to be difficult due to full slabs breaking or developing unacceptable cracking.

The inventor of the present invention has determined that using existing countertops for resurfacing instead of newly constructed wooded substrates allows for improved efficiencies in templating, fabricating, preparing and installing the countertops. This may result in cost and time savings to the customer while providing the lustrous appearance of a solid granite countertop of traditional thickness.

Certain fabrication techniques may use a wooden build up or frame to support stone surfaces that are thinner than traditional stone thicknesses. Such methods typically replace existing countertops using thinner slabs in the same manner as if slabs of conventional thickness were being used. The existing countertops are removed, which risks damage to the underlying frame and ancillary structure, and the new countertops having an underlying frame are installed. In this respect, the processes using thinner natural stone product are really no different nor do they offer any measurable advantages over traditional thicknesses of the natural stone product.

One aspect of the present invention allows for resurfacing existing countertops or other suitable surfaces in natural stone such as granite and marble. An exemplary embodiment allows for using granite slabs of less than approximately two centimeters in thickness with or without a reinforced backing. It will be appreciated that natural stone of granite and marble, for example, having other dimensions may be used for resurfacing applications in accordance with aspects of the invention.

DETAILED DESCRIPTION OF THE INVENTION

Resurfacing an existing countertop in accordance with aspects of the invention may include the step of templating or making templates of the existing countertop. Aspects of the invention may be used for resurfacing various surfaces or used with other substrates such as building original countertops. Slabs of natural stone, such as granite ranging in thickness from about 5 millimeters to about 2 centimeters may be used in accordance with embodiments of the invention. The person making the templates may make notes on the templates that provide instructions or guides to other persons involved in the resurfacing process including acceptable ranges of tolerance to ensure a proper fit when the fabricated stone is installed.

Figure 1:
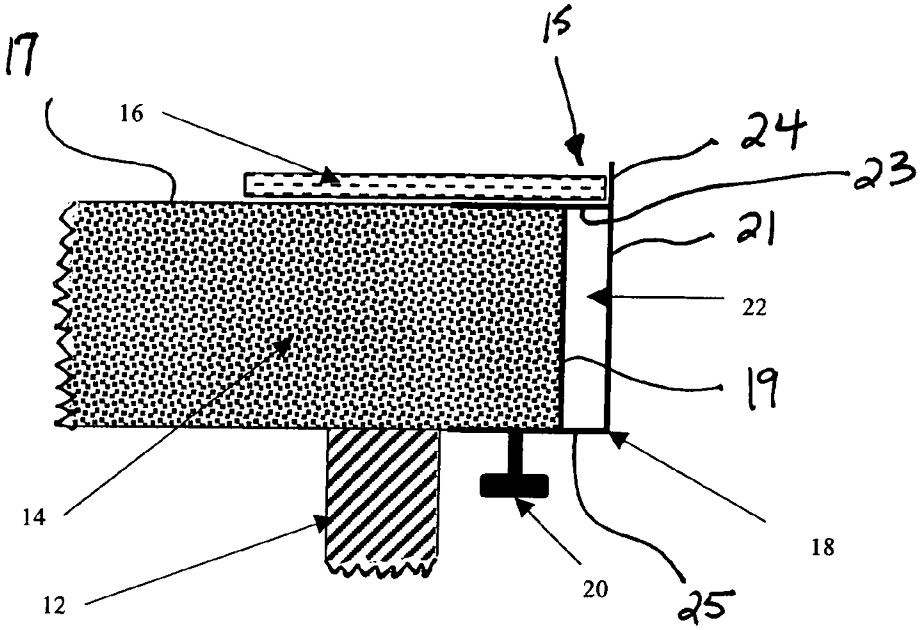
FIG. 1 is a cross-sectional view of an exemplary templating fixture or jig used in accordance with aspects of the invention.

FIG. 1 illustrates a partial cross sectional view of a cabinet frame 12, an existing countertop 14, a Luan strip 16 and an exemplary embodiment of a templating fixture or jig 18. Jig 18 may be used as a means for determining an outside dimension of a replacement piece of stone such as a piece for resurfacing countertop 14. Alternate means may be used or the outside dimension may be estimated based on the actual measurements of countertop 14; however, this may not be as accurate as dimensions determined using jig 18. A wing nut 20 may be used for clamping jig 18 to countertop 14. Jig 18 may be made of various materials such as wood, aluminum or lightweight steel, for instance. Jig 18 may be fabricated in different sizes depending on the dimensions of the substrate being resurfaced, the amount of overhang desired for the material used for resurfacing the substrate and the dimension of substrate edges being resurfaced. Various materials may be used for templating such as ⅛" Luan cut into various sized strips. One or more spaced apart jigs 18 may be fastened at various points to the outer edges of countertop 14 as further shown in FIG. 2. The number of jigs 18 used may depend in part on the length of a countertop 14 edge and/or the area to be resurfaced. Jigs 18 may be sized to accommodate the dimensions of the granite or other material to be installed.

For example, a gap or spacing 22 may be formed in jig 18 to template that portion of granite that will extend beyond the edge of a top surface 17 of countertop 14 as shown in FIG. 1. In this respect, with jig 18 secured to countertop 14 an end portion 15 of Luan strip 16 extends beyond the edge of top surface 17 and abuts an upper flange 24 of jig 18. The end portion 15 simulates the amount of granite surface that will extend or overhang beyond the edge of top surface 17 when the granite surface is installed. In this aspect, a distance, equal to space 22, from the edge of top surface 17 to upper flange 24 may equal a width of a piece of granite that will cover the front edge of top surface 17. This allows for the overhanging portion to join with another piece of granite that fits along the front edge of countertop 14 as more fully described herein. In an embodiment this distance may be about 5 millimeters to about 10 millimeters, which would be the thickness of a granite surface covering top surface 17.

The amount of end portion 15 overhanging top surface 17 may be the same length as the width of space 22, which may be the same dimension as the thickness of the granite being used. Jig 18 may comprise an interior plate 19 that fits flush against the front edge of countertop 14 when fastened in place. An exterior plate 21 may be connected with the interior plate 19 by a top guide plate 23 and a lower guide plate 25. Space 22 may be formed between plates 19, 21 and may be approximately equal to the thickness of granite being installed. Jig 18 may be fastened to countertop 14 by sliding plates 23, 25 over the front edge of countertop 14 and tightening wing nut 20 making sure that plate 19 is snug or flush against the front or old edge.

Figure 2:
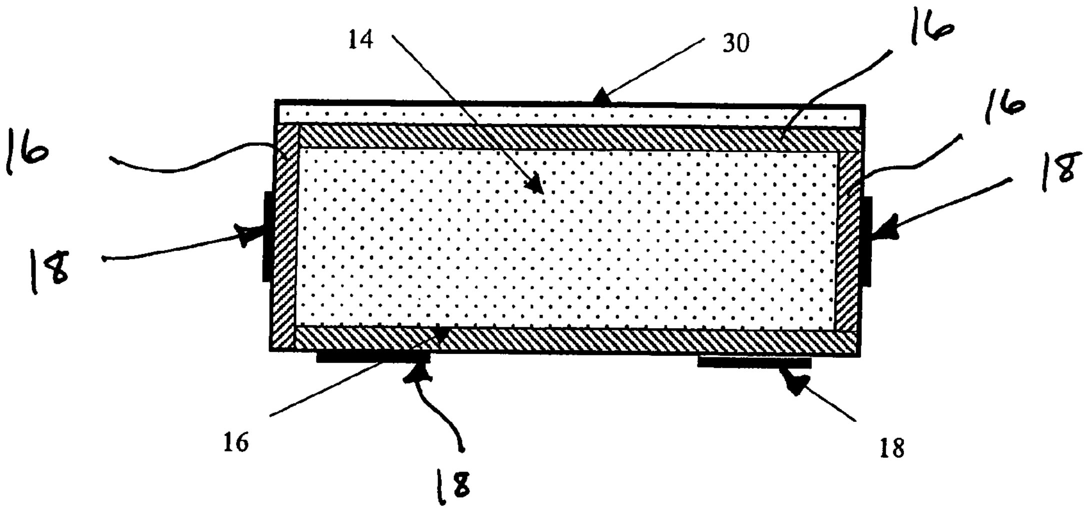
FIG. 2 is a plan view of exemplary templating strips laid out on a material for surfacing a substrate.

Referring to FIG. 2, a plurality of Luan strips 16 may be laid flat for templating the surface of countertop 14. Strips 16 may be laid to abut respective flanges 24 of jigs 18 along the edges of countertop 14 and against all existing walls, back splashes 30 or other structures adjacent countertop 14. The ends of strips 16 may be overlapped so they may be glued together to form a respective template 40 shown in FIG. 3. Prior to gluing, all strips 16 should be snug against respective flanges 24 of jigs 18 and other walls or objects bordering the resurfaced top such as back splash 30 to ensure accuracy. Once strips 16 are in place at least some or all of their respective ends may be glued together to stabilize the template. Alternate methods may be used for templating or determining the dimensions of countertop 14 or other surfaces so that pieces may be cut for resurfacing.

Templates should be sized within an acceptable range of tolerance so that when removed they are substantially identical to the countertop 14 to which they were formed. In certain areas there may be no countertop 14 edge due to limited space, such as where a household range is positioned with respect to the existing countertop. In this respect, the template may be extended to within about 1/16" of the range so that the edge of countertop 14 parallel to the side of the range won't be visible through a gap when the granite is in place.

Figure 3:
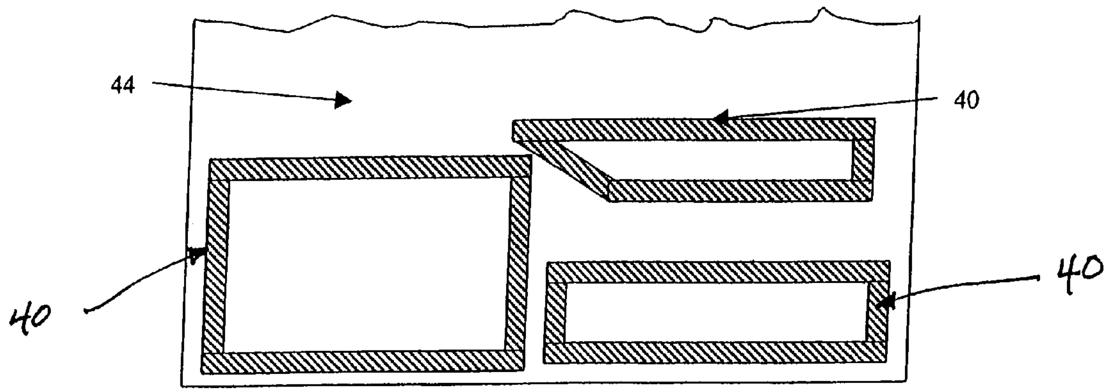
FIG. 3 is a plan view of exemplary templates laid out on a material for surfacing a substrate.

Referring to FIG. 3, after sizing and forming exemplary templates 40 they may be appropriately labeled or identified to associate a template 40 with an area of countertop 14 to be resurfaced and for which a piece of granite will be sized and cut. Digital pictures of existing countertops 14 with and without templates 40 on them provide fabricators with another source of information as well as documenting work for future reference. Information specific to a countertop 14 being resurfaced may be included or noted on appropriate templates 40 during the step of templating. For example, finished edge locations, existing edge thickness, wall location and back splash locations, back splash height and depth, range, refrigerator location, sink center and/or cook top locations, seam locations and tabs may be noted on respective templates 40 for use by a fabricator.

It will be appreciated that aspects of the present invention may be used with natural stone, such as granite and marble of varying thicknesses, or other materials having similar physical characteristics or properties. Some stones, such as a slab of granite come with an attached backing material from the factory to stabilize the stone. Aspects of the present invention may be used with such a backing in place without compromising the integrity of the finished surfaces to be installed.

Referring to FIG. 3, a step of the present invention allows for templates 40 to be laid out on a slab or sheet of stone 44, such as a granite slab having a thickness of between about 5 millimeters and 2 centimeters, in such a manner as to best utilize the entire sheet 44. As will be appreciated, templates 40 provide a representation of a respective surface area of countertop 14 to be resurfaced plus an amount of slab 44 that will extend beyond or overhang an edge of countertop 14 as best shown in FIG. 1. This amount is approximately equal to gap or spacing 22 formed by jig 18.

A step allows for calculating an amount or dimension of material from slab 44 that will be used to cover an edge of countertop 14, such as a front or side edge against which respective interior plates 19 of jigs 18 abut when secured to countertop 14. Other surfaces to be resurfaced such as the front surface and top edge of back splash 30 may be cut from slab 44. A grease pencil or other appropriate marker may be used to trace templates 40 out on slab 44 and transfer any notes from a respective template 40 onto the associated piece of slab 44 to be cutout.

Pieces of slab 44 cut from respective templates 40 may be cut with certain edges forming a right angle with respect to a surface of slab 44. This allows for those edges to abut or fit substantially flush against another surface such as a wall or backsplash 30 not being resurfaced. Other edge portions of a piece of slab 44 may be a miter or bevel cut such as those portions that will be joined with another miter or bevel cut to form a 90° edge or angle such as when resurfacing back splash 30.

Figure 4:
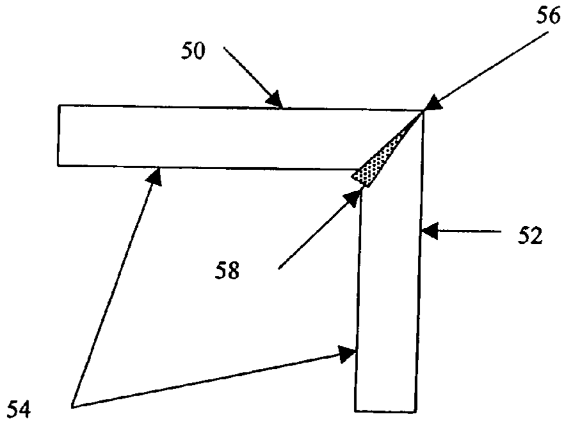
FIG. 4 is an end view of an edge formed in accordance with aspects of the invention.

For example, FIG. 4 illustrates a top surface 50 of a piece cut from slab 44 and a front edge 52 of a piece cut from slab 44 that abut to form an approximately 90° edge. This edge may fit over a corresponding 90° edge surface formed between top surface 17 and the front edge of countertop 14, which is the edge against which interior plate 19 is flush against in FIG. 1. In an embodiment, bevel cuts 56 may be made in the adjoining ends of pieces 50, 52 at approximately 45° to 47°. An angle greater than 45° provides more spacing between the adjoined ends than would be provided at 45° bevel cut. This allows for a greater quantity of glue or adhesive 58 to be applied there between when an edge is formed between pieces 50, 52. The bevel cuts may run the entire length of the respective edges of two pieces of slab 44 to be adjoined. Respective bevel cuts may be made between pieces 50, 52 so that front edge 52 extends upwardly from top surface 50 to form a perimeter or "seawall" around top surface 50 to prevent articles from unexpectedly sliding off top surface 50.

It has been determined that 47° bevel cuts provide a finished seam between pieces 50, 52 of approximately 90° that is tightly adhered or bonded and the amount of adhesive adds strength to the structural integrity of the installed product. Making the bevel cut greater than approximately 47° may cause the glued joint to be too large when joining two pieces to form a 90° seam. This may cause the edge formed between two pieces, such as 50, 52 to not finish at a desired angle and the finished product may not fit over countertop 14 in a desired manner. Bevel cuts of 47° or greater may be used when forming an obtuse angle between two pieces cut from slab 44.

Figure 4A:
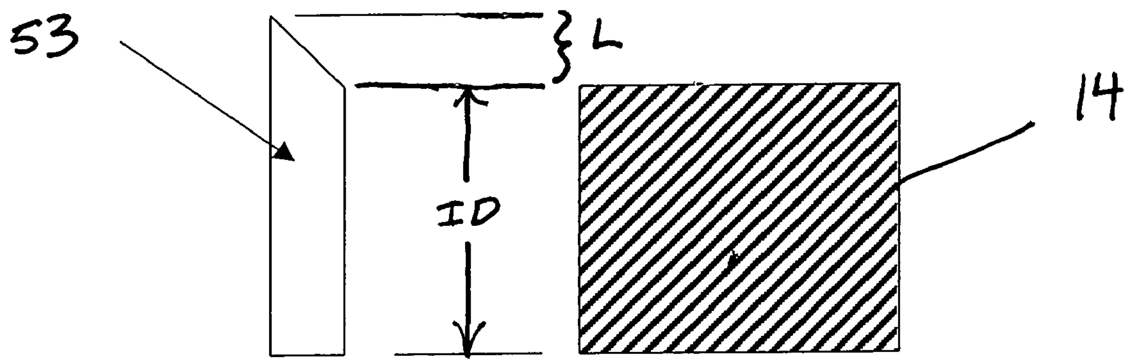
FIG. 4A illustrates a relationship between an edge band and a countertop for sizing the edge band.

When cutting pieces from slab 44, such as an edge band 53 shown in FIG. 4A used for resurfacing existing edges of countertop 14 or pieces for resurfacing a back splash, the width of the cut for a piece may be calculated based on an inside dimension "ID" of a respective template 40 for that piece plus the length "L" of the associated bevel cut as shown in FIG. 4A. This length "L" will vary based on the stone thickness.

Pieces cut from slab 44 may be kept flat and well supported during the fabrication process to help eliminate any warping or cracks from forming prior to and during installation. Some of the relatively thinner stones with affixed fiberglass backings have a tendency to warp or bow. Once this occurs the material will not easily return to its original shape and forcing it may cause cracking. Natural stone is very hard and is also quite brittle and will crack very easily. Suction cups may be used to move material whenever possible to help prevent damage.

Pieces cut from slab 44 may be laid with their finished face down so that any miter cuts, such as cuts 56, are facing up. The pieces may be supported so that the surfaces of the stone along the edged sides are accessible and exposed for taping the pieces to be adjoined in close proximity to each other. Blocks or other types of boards may be used as a form to support the pieces.

Once supported, the pieces may be prepared for being adjoined to build edges that will fit over edges of existing structures such as the existing edges of countertop 14. Pieces of slab 44 for covering edges of countertop 14, such as edge bands 53, may be cut to length. If an edge band 53 is coming together with another edge band 53, such as in the case of an inside or outside corner, an appropriate miter cut on each edge band 53 may be made to ensure a fit and finish within acceptable ranges of tolerance.

Figure 5:
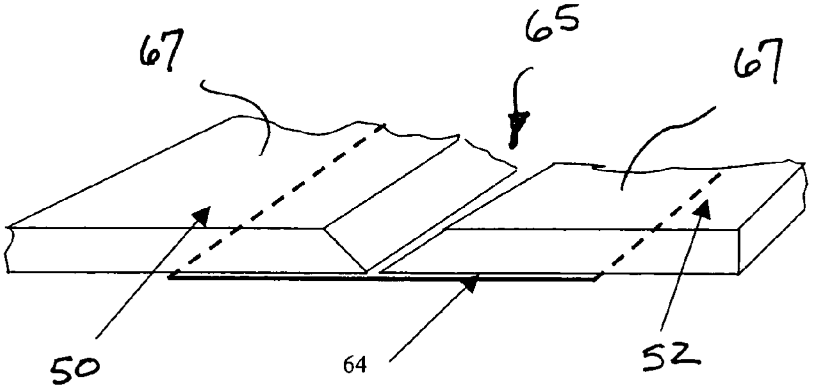
FIG. 5 is a broken view of two exemplary pieces of material to be adjoined in accordance with aspects of the invention.

For example, referring to FIG. 5, piece 52 may be cut from slab 44 to cover a front edge of countertop 14 and may be laid flat with its beveled edge portion laying "point-to-point" with an opposing beveled edge portion of piece 50 cut for the top surface 17 of countertop 14. The material forming these pieces may be sufficiently dried prior to adjoining the pieces to ensure a good bond. An appropriate adhesive material 64 such as a 7-mil, 2" clear vinyl tape may be used to hold the two pieces 50, 52 together as if to create a hinge there between. This allows for pieces 50, 52 to be maintained in the same relative position with respect to one another when being adjoined.

The adhesive or tape 64 is strong enough to hold pieces 50, 52 together while being sufficiently elastic so that when pieces 50, 52 are "folded" toward one another to form a 90° angle not too much of adhesive 58 is squeezed or forced out of the joint formed there between. The clarity of tape 64 allows the fabricator to see whether or not the joint will be tight enough once pieces 50, 52 are glued together. Tape 64 may span the full length of the joint for strength as well as to prevent the adhesive from flowing out onto a finished surface of pieces 50, 52.

Acetone may be used to remove dirt and dust particles from the bevel cut surfaces prior to gluing pieces 50, 52 together. Acetone is beneficial because it will clean the glue joint and dry almost immediately for quickly proceeding to a step of gluing. If the joint is not clean and dry adhesive 58 may not bond properly. Glue or adhesive 58 may be a two-part adhesive or glue that may be used mixed with the proper coloration to blend with the stone from which pieces 50, 52 are cut. The two parts may be mixed and adhesive 58 spread in the joint 65 formed by the beveled edges of pieces 50, 52 best shown in FIG. 5. In one aspect, joint 65 is covered as much as possible by applying adhesive 58 so it is flush with the surfaces 67 of pieces 50, 52. Any voids or air pockets formed in adhesive 58 during application should be minimized or eliminated.

Figure 6:
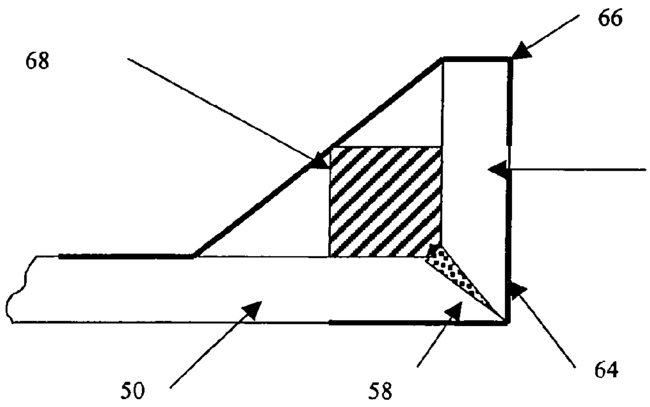
FIG. 6 is an end view of the pieces of FIG. 5 assembled to form an edge.

As shown in FIG. 6, after applying adhesive 58 pieces 50, 52 may be "folded" together to create an approximately 90° angle there between, which may be checked using a square. This angle forms an outer edge that may fit over an existing edge of countertop 14 when the finished product is installed. A piece of 2" wide waterproof masking tape 66 may be used to hold pieces 50, 52 together. Masking tape 66 is preferred over other means of adhering to avoid damage to the stone making pieces 50, 52. Clamp or clamping devices may result in edge or surface cracks in pieces 50, 52 causing them to be wasted.

After pieces 50, 52 are folded into place there may be excess glue 58 on the inside of the joint 65. The excess may be screed out of the inside of joint 65 so it will not harden and prevent the finished product from fitting properly at installation. Glue 58 may have a defined working time and no more glue than what can be applied during the allotted working time should be mixed in order to prevent waste or premature hardening.

An appropriately sized block 68 having a chamfered corner may be temporarily placed on the inside of joint 65 to ensure the proper angle is achieved while glue 58 is drying. Block or blocks 68 may be held in place with tape 66. Once glue 58 has cured or become substantially set block 68 and masking tape 66 may be removed with vinyl tape 64 remaining in place to provide protection during a polishing step. Drying times of glue 58 will vary depending on the type, brand, temperature and climate prevailing during gluing.

Figure 7:
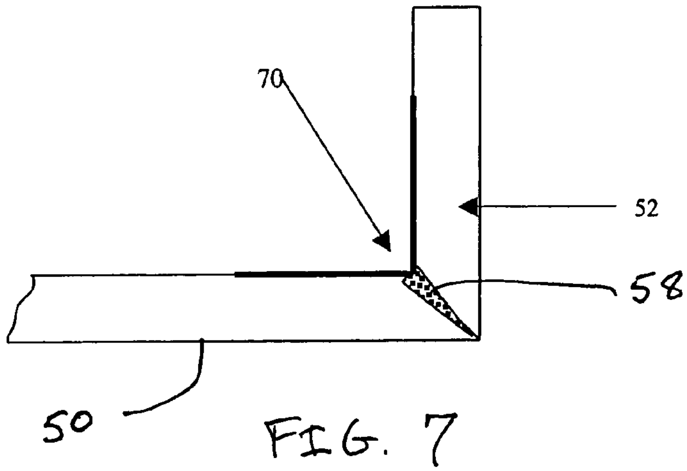
FIG. 7 is an end view of the assembly of FIG. 6.

Referring to FIG. 7, one aspect allows for reinforcing an inside edge formed by pieces 50, 52 proximate joint 65 using an adhesive material 70 such as a 1½"-6 oz. fiberglass cloth 70, for example. Alternate materials may be used to achieve this reinforcement. Material 70 may be laid along all or part of the inside edge to cover joint 65 created when pieces 50, 52 are glued together. Other means may be used to reinforce joint 65 to strengthen the structural relationship between pieces 50, 52. Once material 70 is applied it may be coated with a liquid mixture such as a polyester resin mixed with a sanding aid and MEK-P catalyst. This three part liquid resin will absorb and harden the fiberglass cloth to create an extremely strong, corrugated fiberglass reinforcement.

Applying material 70 covered with liquid resin helps to ensure that joints formed between various pieces of stone, such as 50, 52 do not fail or crack during or after installation. Material 70 and liquid resin my be applied to some or all inside horizontal or vertical edge joints. Material 70 and liquid resin should preferably form a relatively smooth surface against the inside surfaces of stone or otherwise the new stone top may not fit properly over countertop 14. Any excess material 70 or liquid resin may be sanded down after it has set.

Aspects of the invention may be used to create a wide range of structures such as those used to resurface existing countertops 14 and back splashes 30 in a home with natural stone such as granite. It will be appreciated that aspects of the invention may be used to form these structures in a manner so that the granite fits over top of the existing structure being resurfaced. For example, a replacement countertop of granite may be formed to fit over existing countertop 14. To help ensure a proper fit, templates 40 may be placed inside of each respective structure formed with a template 40 prior to the structure's installation. Template 40 should fit inside the respective structure and allow a fabricator to compare the dimensions of template 40 with the structure. If template 40 does not fit inside the new structure within allowable tolerances then the structure may be adjusted or remade, if necessary. All inside dimensions of the structure may be verified to make sure they are what a respective template 40 requires.

Figure 8:
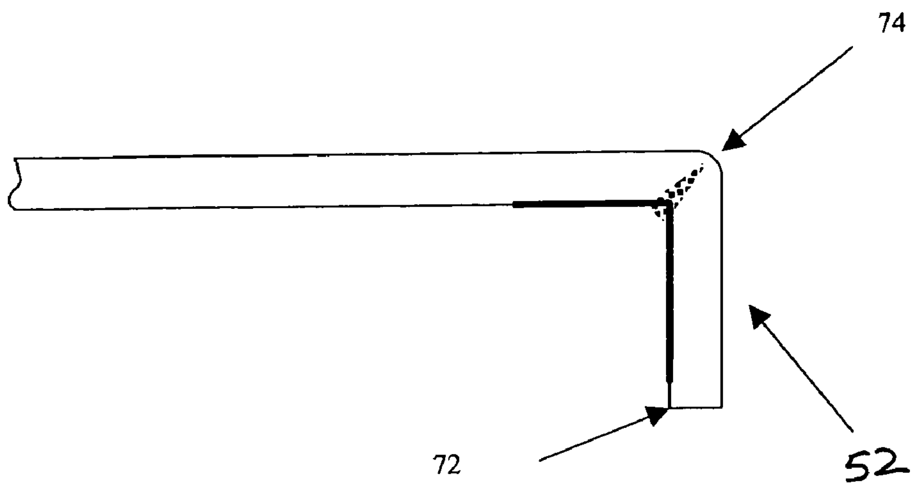
FIG. 8 is an end view of the assembly of FIG. 6.

Once all structures have been fitted to a respective template 40 then the edges of each structure may be polished. Polishing may be performed using a series of nine diamond pads attached to a polishing machine, for example, where each subsequent pad has finer level grit. The polishing step may be a wet process. In one aspect, the seam formed at outer edge 74 where the approximately 47° bevels of pieces 50, 52 have been glued together and the very bottom of the edge 72 as shown in FIG. 8 may be polished. The top or outer edge 74 may be polished to a ¼" radius in order to give the edge a softer look and feel. Any back splashes 30 may be polished in a similar manner. Once all the top edges 74 have been polished the new seam should be inspected for any voids or air pockets in the glue 58. If any voids are found they may be filled using the same adhesive 58 that was used for bonding joint 65.

Structures or "tops", such as a replacement countertop formed of granite that will fit over countertop 14, may be prepared for any cutouts, such as those needed for cook tops, sinks, under mount sinks, outlet holes in back splash 30, etc. With the exception of under mount sinks it is preferable that all other cutouts be done in the field. Notwithstanding the reinforcement of the replacement tops with material 70 and liquid resin they are still vulnerable to cracking and should be handled with care. Keeping the new replacement tops straight and supported, using suction cups whenever possible, will help to ensure a damage free product.

Aspects of the invention allow for extending existing surfaces such as countertop 14, for instance. This may be accomplished by extending a respective template 40 to a desired dimension and fabricating the replacement top to include the extended dimension. Since existing countertop 14 has not changed in size a substrate of the same thickness as the existing countertop 14 may be constructed to support the extended portion of the new top. At the time of installation an adhesive may be applied near the edge of existing countertop 14 and the substrate to bond this new internal seam together.

Another aspect of the invention allows for fabricating an edge, such as piece 52 in a replacement top that has a radius of curvature that matches a radius of curvature in a top surface such as piece 50. This allows for fabricating replacement tops of granite having a circumferential or curvilinear edge extending downward there from that may fit over surfaces having nonlinear edges such as an oval counter or table top with rounded ends, for example. In this aspect, a respective template 40 may be formed to represent the shape of a top surface 17 having a radius of curvature for which a replacement top is to be fabricated. Template 40 may be used to trace the surface and radius of curvature(s) onto slab 44. The radius may then be cut from slab 44 using a common die grinder with a 4" continuous rim blade, for example.

An approximately 47° bevel, such as those cut in pieces 50, 52 shown in FIG. 5, may be cut along the radius of curvature on the underside of the granite piece cut from slab 44, using the same tool. A piece of backing such as a 1" piece of Styrofoam or other suitable material may be used to make a form having a radius of curvature patterned the same as the short point of the radius of curvature on the backside or underside of the granite piece. The Styrofoam may be affixed to the underside of the granite top using a hot glue gun so that the radius of curvature of the Styrofoam substantially aligns with and is setback from the radius of curvature defined by the granite top.

This allows for the Styrofoam form or template to be used as a temporary substrate or backing when adjoining an edge to the granite top. The inventor of the present invention has found that it is impossible to bend a granite edge band 53 having a thickness of between about 5 millimeters and 2 centimeters into a sufficiently tight radius of curvature to fit around a curved end of a standard tabletop, for example, or to form other desired radiuses without breakage or damage. Consequently, in one aspect of the invention, an edge band 53 may be segmented by cutting it into individual mitered pieces as shown in FIG. 9.

Figure 9:
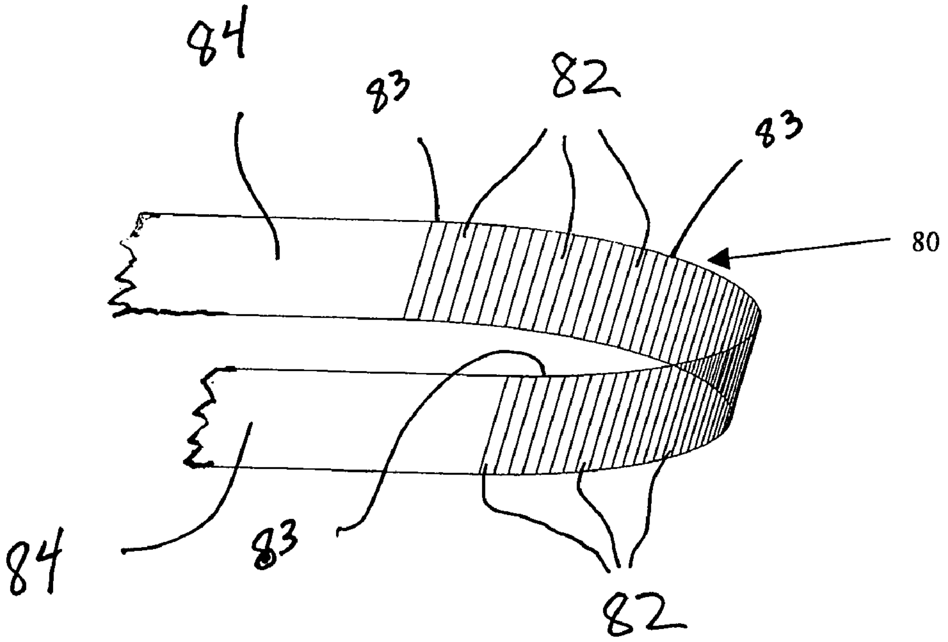
FIG. 9 is a perspective view of an edge band prepared with a radius of curvature in accordance with aspects of the invention.

FIG. 9 illustrates a segmented radius edge 80 that may comprise a plurality of individual mitered pieces 82. Pieces 82 may be cut at a width of not greater than about ¾" to 1" each with each piece 82 being of approximately equal width. An upper edge 83 of each piece 82 may have a miter or bevel cut of approximately 45°–47° to mate with a similarly sized bevel cut in the underside of the granite top's edge to which pieces 82 may be adjoined. The lateral edges or sides of each piece 82 may have a miter or bevel cut along their length for mating and being bonded with an adjacent piece 82. Segmented radius edge 80 may be bonded at each end with respective edge segments 84.

The angle of the bevel cuts may vary depending on the dimension of a radius of curvature being formed and in an embodiment the bevel cuts are approximately 10°. Making bevel cuts in the lateral edges of each adjacent piece 82 allows for those pieces 82 to conform to the shape of the radius of curvature when adjoined while forming an outer surface that is substantially smooth. The lateral edges of a piece 82 may have bevel cuts in opposing directions to form curvilinear shapes such as an "S", for example.

A piece of vinyl tape, such as tape 64 may be used to tape all the pieces 82 together in a vertically orientated, adjacent manner with the respective mitered edges abutting each other. Vinyl tape 64 is strong enough to hold pieces 82 together and flexible enough to simultaneously bend around the radius. The bevel on the underside of the granite top may be aligned with the bevels on the upper edges 83 of the segmented pieces 82 and pieces 82 may rest against the Styrofoam form. This allows for proper alignment and fit of pieces 82 to be checked within acceptable tolerances.

After verifying a proper fit will be obtained, glue or adhesive 58 described herein may be used to bond pieces 82 together and to the underside of the granite top at the mating beveled cuts. Glue 58 may be spread on the respective bevel cuts in the underside of the granite top and the upper edges 83 of each piece 82, and in each individual miter cut along the sides of pieces 82. The taped pieces 82 may then be wrapped around the Styrofoam form and secured to the Styrofoam form and granite top with more vinyl tape 64.

Once glue 58 has hardened the Styrofoam substrate may be removed by using a utility knife, razor scraper and an 80-grit disc sander, for example. Once the Styrofoam substrate is removed the inside edge formed between the segmented radius edge 80 and the granite top may be reinforced using material 70 and liquid resin as described herein. Tape 64 may then be removed and the outer edge seam may be polished. The polishing process may be the same as described above with a finished radius of approximately ¼" on the top outer edge. The vertical surface of finished segmented radius edge 80 may be polished to ensure pieces 82 blend together to seemingly form one piece.

Installation of the finished natural stone structures leaves a lasting impression on the consumer. The quality of the installation also affects the overall strength and durability of the new structures.

An existing surface or structure to be resurfaced, such as countertop 14 may be prepared for installation of the new top. A straight edge may be laid across countertop 14 to find any high or low spots. The surface of countertop 14 should be substantially flat for installation of the new top. Any high or low spots should be addressed prior to the new tops being installed. Low spots may be circled with a permanent marker and filled or built up by applying extra adhesive in those areas. More severe low areas may require loosening countertop 14 from its underlying support structure, such as a cabinet and installing shims between countertop 14 and the support structure. High spots may be sanded down or even ground down in the case of harder surfaces such as ceramic tile. Regardless of the type of existing countertop 14, ceramic tile, laminate, solid surface, butcher block, etc. the surface should be completely or substantially flat to avoid cracking or breaking of the new top once installed.

An inside edge of a granite top or other structures formed in accordance with aspects of the invention, such as one formed between pieces 50, 52 may have a slight radius due to application of material 70 and liquid resin. In most cases, an existing countertop 14 will have square edges. These square edges may be cut with a bevel or chamfer to receive the radius of the new top's inside edge. This may be accomplished by sanding, grinding or in the case of laminate countertops using a trim router with a beveling bit.

The majority of existing countertops 14 have a smooth surface texture, which is not conducive to adhesion or bonding with a replacement top. In order to maximize the adhesion, a countertop's 14 surface may be treated to form a rough surface texture to which a glue or adhesive can bond a replacement granite top. This may be accomplished with a low grit sand paper, for example. In one aspect, a minimum of about 90% of the countertop's 14 surface may be textured or roughed to ensure proper bonding. Once the surface has been roughed it may be thoroughly cleaned and made substantially dust-free such as by using Acetone.

It will be recognized that there are generally two types of sinks: surface mount and under mount, being used by way. An under mount sink, such as one used in a household kitchen, is a sink mounted underneath a countertop surface thereby eliminating any exposure of the sink's rim above the countertop surface. A surface mount sink has the rim overlapping a portion of the countertop surface.

Before installing it may be necessary to cutout a portion of the top with respect to a sink. With a sink existing within countertop 14, a respective template 40 may be laid on the existing countertop 14 and the existing opening for the sink templated. The templated opening may be transferred onto the replacement granite top and the opening may be cutout such as by using a die grinder with a 4" diamond blade. Once the sink area is cutout an unfinished edge of the replacement granite top is exposed, which may be polished as described above.

Figure 10:
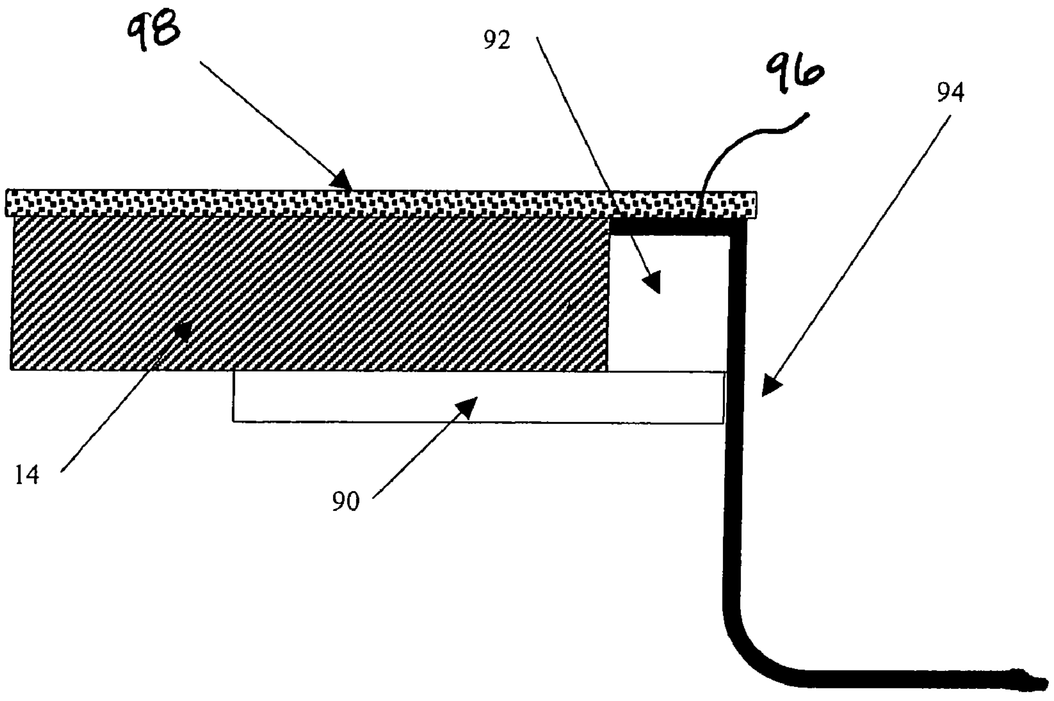
FIG. 10 is a partial cross-sectional view of an exemplary replacement top installed in a typical countertop arrangement.

An under mount sink may be installed by cutting a hole in the existing countertop 14 slightly larger, approximately ¼" on all sides, than the overall sink dimensions. Referring to FIG. 10, a piece of plywood or other suitable material may be attached as a cleat 90 to the underside of countertop 14 at one or more locations. Cleat 90 may be built up with shim 92 so that when in place an under mount sink 94 sets flush with the top surface of existing countertop 14. The size of shim 92 or build up may be determined by the thickness of the under mount sink rim 96. Alternate embodiments may use brackets (not shown) to affix under mount sink 94 to countertop 14 so its rim 96 is flush with countertop 14 as shown in FIG. 10. The approximate ¼" reveal or spacing cut on all sides of the existing countertop 14 allows for the sink 94 to be adjusted laterally when in place beneath the new top 98.

Other openings for fitting the replacement granite top 98 in place may be marked and cutout such as those for a cook top or outlet holes in back splash 30. Any replacement granite structure, such as replacement countertop 98 may be dry-fit to verify that all edges fit tightly against the existing structure being resurfaced such as existing countertop 14. Dry fitting also allows for verifying that the bottom of any new edge will be flush with or extend slightly below the bottom of any existing structure edges. If all replacement granite structures fit properly they may be glued in place.

Adhesives may be used to bond the replacement granite structure 98 to a respective substrate such as existing countertop 14. Three exemplary types of adhesive that may be used are: Lord 7545AB, which is a rapid set Urethane adhesive, Acrylic tile adhesive, which is a slower bonding adhesive and Laticrete 310R a rapid setting epoxy that may be used particularly for vertical applications in excess of about 6". Using a combination of a rapid set adhesive with a slower bonding one allows for the installer to make adjustments to the replacement top to ensure a proper fit.

The Acrylic adhesive may be spread using a ¼"×⅜×¼" grooved trowel over the surface of countertop 14, so that a minimum of approximately 90% of the surface area is covered. Approximately 1/2" of clean surface may be left around all edge and opening perimeters for applying the 7545AB adhesive. Additional adhesive may be added where needed in low areas that may have been marked previously or identified during application of the adhesive. The 7545AB may be applied using a gun provided by the manufacturer, for example. An approximately ¼" continuous bead may be applied around all edge perimeters and the perimeter edges of any openings.

Replacement granite structure 98 may be positioned onto the existing structure or substrate, such as countertop 14 while minimizing sliding of the structure 98 across the surface of countertop 14, which may disturb the adhesive. Once the replacement granite top 98 is set in place it may be pressed down on firmly working from the center out to obtain a good fit.

The replacement granite top 98 may be clamped where necessary using pinch clamps, for example. Clamping does not require excessive pressure. If too much pressure is required then there may be a problem in the preparation of the countertop 14 surface. In this case, replacement granite top 98 may be removed, the adhesive cleaned off, replacement granite top 98 refit and the process repeated. The 7545AB only has a working time of about 5–7 minutes at 72° F. so it is important that once the adhesive is applied replacement granite top 98 is immediately installed. Silicone may be used where granite meets granite and caulking where granite meets any other surface. There are several silicones commercially available just for granite applications. The installed top 98 may be cleaned using a natural stone cleaner.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

I claim as my invention:

1. A method of resurfacing a substrate with a natural stone, the method comprising:

releasably attaching a plurality of templating jigs to an edge of the substrate, each of the plurality of templating jigs comprising an upwardly extending flange;

placing a plurality of templating strips on a top surface of the substrate and against respective ones of the upwardly extending flanges to form a template sized to cut a first piece of the natural stone for resurfacing the top surface of the substrate;

removing the template from the top surface of the substrate;

overlaying the template on the natural stone;

cutting the first piece of natural stone based on an outside dimension of the template;

cutting an edge band of natural stone sized to resurface the edge of the substrate;

cutting a bevel in an edge along a length of the first piece of natural stone;

cutting a bevel in an edge along a length of the edge band of natural stone;

adjoining the first piece of natural stone and the edge band of natural stone to form a replacement piece, the first piece of natural stone and the edge band of natural stone adjoined along their respective beveled edges to form a substantially right angle there between having an inside edge;

applying a fiberglass cloth to the inside edge; and adhesively joining the replacement piece to the top surface and the edge of the substrate.

2. The method of claim 1 further comprising:

releasably attaching the plurality of templating jigs so that a distance between the edge of the substrate and respective ones of the upwardly extending flanges is equal to a portion of the first piece of natural stone that will overhang the edge of the substrate.

3. The method of claim 2 wherein the distance between the edge of the substrate and respective ones of the upwardly extending flanges is equal to a thickness of the edge band of natural stone.

4. The method of claim 1 further comprising:

cutting a plurality of natural stone pieces of substantially the same dimensions, each piece comprising a respective top edge and respective lateral edges;

cutting a radius of curvature along an edge of the first piece of natural stone;

cutting a bevel of approximately 10° in the respective lateral edges of the plurality of natural stone pieces;

cutting a bevel of approximately 45° to 47° in the respective top edges of the plurality of natural stone pieces;

cuffing a bevel of approximately 45° to 47° in the edge of the first piece of natural stone having the radius of curvature;

adjoining the plurality of natural stone pieces along their respective lateral edges to form a segmented radius of curvature; and adjoining the segmented radius of curvature to the edge of the first piece of natural stone having the radius of curvature.

5. A method of fabricating and installing a structure on an existing substrate, the method comprising:

providing a sheet of natural stone having a thickness of about 5 millimeters to 10 millimeters;

releasably attaching a plurality of templating jigs to an edge of the existing substrate, each of the plurality of templating jigs comprising an upwardly extending flange;

placing a plurality of templating strips on a top surface of the substrate and against respective ones of the upwardly extending flanges to form a template sized to cut a first piece of natural stone;

removing the template from the top surface of the substrate;

overlaying the template on the sheet of natural stone;

cutting the first piece from the sheet of natural of stone based on an outside dimension of the template;

cutting a second piece from the sheet of natural stone;

adhesively joining the first piece of natural stone and the second piece of natural stone to form the structure; and adhesively joining the structure to a surface of the existing substrate.

6. The method of claim 5 further comprising:

applying a fiberglass cloth to an inside edge of the structure; and coating the fiberglass cloth with a polyester resin.

7. The method of claim 5 further comprising:

cutting a plurality of pieces from the sheet of natural stone for forming a segmented radius of curvature;

adhesively joining the plurality of pieces together to form the segmented radius of curvature; and adhesively joining the segmented radius of curvature to at least one of the first piece of natural stone and the second piece of natural stone.

8. The method of claim 5 at least one of the plurality of templating jigs comprising a flange extending a distance from the edge of the existing substrate when the jig is releasably attached to the edge wherein the distance is equal to a width of the second piece.

9. The method of claim 5 further comprising:

cutting an approximately 45° to 47° bevel in an edge of the first piece of natural stone;

cutting an approximately 45° to 47° bevel in an edge of the second piece of natural stone; and adhesively joining the first piece of natural stone and the second piece of natural stone along their respective bevel cuts to form a substantially right angle.

10. The method of claim 9 further comprising:

cutting an opening in the first piece of natural stone;

bracketing an under mount sink in fixed position with respect to the existing substrate; and adhesively joining the structure to the surface of the existing substrate so the under mount sink is accessible through the opening in the first piece.

11. The method of claim 9 further comprising:

adhesively joining the structure to the surface of the existing substrate using a first adhesive having a first setting time and a second adhesive having a second setting time where the first setting time is longer than the second setting time.

12. The method of claim 5 further comprising:

cutting the first piece of natural stone to include an edge defining a radius of curvature;

cutting a plurality of pieces from the sheet of natural stone for forming a segmented radius of curvature;

cutting an approximately 10° bevel in the respective lateral edges of the plurality of pieces of natural stone for forming the segmented radius of curvature;

adhesively joining the plurality of pieces of natural stone together along respective bevel cuts to form the segmented radius of curvature; and adhesively joining the segmented radius of curvature to the edge of the first piece of natural stone defining the radius of curvature.

* * * * *